US006284694B1

(12) United States Patent
Moeltgen et al.

(10) Patent No.: US 6,284,694 B1
(45) Date of Patent: *Sep. 4, 2001

(54) MOULDED SPHERICAL CERAMIC BODY, PRODUCTION PROCESS AND USE

(75) Inventors: Paul Moeltgen, Laufenburg; Pirmin Wilhelm, Bad Sackingen; Martin Luette, Murg, all of (DE)

(73) Assignee: Korund Laufenburg GmbH, Laufenburg (DE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/117,227
(22) PCT Filed: Jan. 13, 1997
(86) PCT No.: PCT/EP97/00126
    § 371 Date: Nov. 23, 1998
    § 102(e) Date: Nov. 23, 1998
(87) PCT Pub. No.: WO97/27154
    PCT Pub. Date: Jul. 31, 1997

(30) Foreign Application Priority Data

Jan. 25, 1996 (DE) .............................. 196 02 525

(51) Int. Cl.$^7$ ................................... C04B 35/111
(52) U.S. Cl. .................. 501/127; 423/625; 423/628; 51/293; 264/653; 264/662
(58) Field of Search .................. 501/127; 427/427; 423/625, 628; 264/12, 653, 662; 51/293

(56) References Cited

U.S. PATENT DOCUMENTS

| 4,179,408 | * | 12/1979 | Sanchez et al. | 252/448 |
| 4,954,462 | * | 9/1990 | Wood et al. | 501/128 |
| 5,190,567 | * | 3/1993 | Tamamaki et al. | 51/293 |
| 5,261,930 | * | 11/1993 | Fliedner et al. | 51/293 |
| 5,587,346 | * | 12/1996 | Zuk . | |
| 5,627,116 | * | 5/1997 | Zuk . | |
| 5,665,127 | * | 9/1997 | Moltgen et al. | 51/293 |
| 5,916,536 | * | 6/1999 | Deville et al. . | |

FOREIGN PATENT DOCUMENTS

429635 * 9/1977 (SU) .

OTHER PUBLICATIONS

"Evaluated Material Property for a Sintered α alumina" Munro, J Am Ceram Soc. (1997), 80 (8), p 1919–1928 (Abstract Only).*

"Alumina of High Reliability by Centrifugal Casting" Huisman et al. Nichtmetallische Werkstoffe, ETH Zurich, 8092 Switz J Europ. Ceram Soc 1995, 15(9) p 811–821, (Abstract Only).*

"Seeding with gamma alumina for transformation & microstructure contrast in Bochrite derived alpha alumina" McArdle et al. J American Ceramic Society (1986), 69(5), C/98–C/101.*

* cited by examiner

Primary Examiner—Paul Marcantoni
(74) Attorney, Agent, or Firm—Perkins, Smith & Cohen; Jerry Cohen

(57) ABSTRACT

The present invention concerns a moulded microcrystalline spherical $Al_2O_3$- sintered body, process for its production as well as use.

17 Claims, No Drawings

MOULDED SPHERICAL CERAMIC BODY, PRODUCTION PROCESS AND USE

The present invention relates to a moulded microcrystalline spherical $Al_2O_3$ sintered body, a process for manufacturing this, and the use thereof.

The processes used to manufacture ceramic balls can be divided into mechanical, chemical, conventional (fusion) metallurgy, and powder metallurgy methods.

The mechanical process are essentially restricted to achieving the spherical shape by mechanical processing using such methods as grinding, polishing, or smoothing. One prerequisite is that an appropriately prepared moulded body be used, this then being subjected to further processing to form a ball. The mechanical production of balls frequently requires that a conventional metallurgy, chemical, or powder metallurgy method be used beforehand in order to obtain the appropriate moulded body that is then subjected to further processing.

The chemical processes are particularly suitable for obtaining materials that are as pure as possible. One process that has recently been used more and more frequently is the so-called sol-gel process, In this sol-gel process, so-called colloidal solutions are formed with suitable solvents, starting from metallic salts. The solvent is usually water and contains the metal compound in the form of nano-scale oxides or hydroxides that are present, dissolved colloidally with the help of appropriate dispersants or stabilisers. Gelling can be brought about by modifying the pH value, temperature change, or aging/adding electrolytes. Spherical gel particles are obtained by dropping the sol into a medium that promotes formation of the gel, or exposing it to such a medium in gaseous form. The spherical gel particles are then dried, calcined, and sintered.

Sol-gel processes for manufacturing ceramic balls are described, for example, in GB-A 1 032 105, DE-A 3 035 845, DE-A 2 147 472, DE-A 2 733 384, and DE-B 2 753 503. In most cases, these processes relate to the production of combustion or fuel particles based on thorium or uranium. EP-A 0 224 3 75 describes the production of transparent spherical microballs based on zirconium oxide, using the sol-gel method.

The sol-gel processes are techically costly, and require relatively costly raw materials; in addition, they are not without problems from the ecological standpoint because inorganic acids, such as nitric acid and hydrochloric acid, are frequently used a stabilisers for the sol; these are then liberated once again as chlorine or nitrous gases during the calcining or sintering processes.

Ceramic balls can be manufactured using conventional metallurgical methods by dropping the liquid smelt into a cooling medium, by blowing the smelt with air, or by atomizing the liquid smelt with an air/water mixture. One elegant process is the production of spherical ceramic particles using rotating disks, the smelt being poured onto the rotating disks that then throw off the still-liquid smelt in the form of droplets. The droplets harden relatively quickly to form ceramic balls. However, it is difficult to obtain pure and compact spherical ceramic particles using these processes, which are particulary well-suited for extracting metals.

Powder metallurgy processes have recently become increasingly important for the production of spherical ceramic particles. One of the most important processes within this group is agglomeration. The underlying principle of agglomeration is based on the clustering of individual powder particles as the result of systematic movement of a powder bed. In most instances, a binder must be added to the powder, when either a liquid or solid binder is selected, depending on the type of powder that is being used. From the technical standpoint, liquid binders are the most important; in these, the water and alcohol systems dominate because they are easier to handle. In the case of processes that use solid binders, in most instances waxes or stearates are added as agents that enhance adhesion.

Air humidity plays an important role in the dry processes, which work without the addition of adhesion-enhancing additives.

In the normal course of events, containers or mixers that can be moved systematically in different ways are uses for powder agglomeration; several types of movement can also be combined with each other.

GB-A 1 344 870 and GB-A 1 344 869 describe the production processes for moulded spherical ceramic bodies, in which wax and stearates are used as binders. JP-A 05 137 997 describes the production of moulded spherical zirconium oxide, aluminum oxide, and mullite bodies, using water, aqueous solutions of carboxy-methyl-cellulose, polyvinyl alcohol, and/or polyethylene-glycol as binder. DE-B 1 229 055 describes the production of argillaceous-earth balls by rolling activated argillaceous earth in a cylindrical ball-moulding machine while simultaneously spraying it with water.

The demand for low-priced, very pure, wear-resistant ceramic balls that possess great mechanical strength, to be used, for example, as grinding bodies, ball bearings, etc., cannot be satisfied, or can be satisfied to only a limited degree, by using the processes referred to above.

DE-A 3 507 376 describes a process and an apparatus for manufacturing granulates with a very narrow grain-size distribution, in which the product that is to be granulated is sprayed into a fluid bed and there applied to appropriate nuclei. The grain size is adjusted by the strength of the flow of separating gas of a zig-zag separator. Similar processes or developments of the so-called fluid-bed spray granulation process are described in DE-A 3 808 277 and DE-A 4 304 405.

The fluid-bed spray granulation process is usually used for drying and agglomerating agrochemical substances (fungicides, insecticides, herbicides, growth regulators, and fertilizers), pest control agents, pharmacologically effective substances, nutrients, sweeteners, colouring agents, and inorganic and organic chemicals. In addition to the active components and thinners, there may also be inert fillers, dispersants, binders, and/or other additives, for example, preservatives and colouring agents, in the liquid product that is to be sprayed in.

The granulate particles that are obtained by fluid-bed spray granulation are distinguished by their uniform shape and great solidity; these characteristics make it simpler to handle, measure and process the original, finely powdered material, and in some instances even make these operations possible for the first time. Because of their microporous structure and the large surface areas associated therewith, the granulates can be redispersed spontaneously, which means that the la process is predestined for processing agrocherical substances, pest-control agents, and pharmacologically effective substances.

It is the task of the present invention to provide moulded spherical sintered bodies that do not have the disadvantages found in the prior art. Surprisingly, it was found during drying trials with ceramic powder suspensions based on $Al_2O_3$ that by using fluid-bed spray granulation, it is possible to obtain extremely dense green bodies that can be sintered directly to form a dense ceramic body, without any additional manipulation, such as compacting. Because of the high basic density of the granulate and the fineness and sinter activity of the initial powder, for all practical purposes it is possible to suppress grain growth almost completely during the sintering process, so that a moulded microcrystalline spherical sintered ceramic body that is distinguished by particular toughness and wear resistance results.

The object of the present invention are moulded microcrystalline spherical sintered bodies that are based on α-aluminum oxide, the average grain size $d_{50}$ of the primary crystals being preferably smaller than 3 μm, the diameter of the moulded sintered bodies being between 0.01 and 10 mm, and the moulded sintered bodies being of a hardness of >16 Gpa ($HV_{200}$) and a density of >95% of the theoretical density TD. The moulded microcrystalline spherical sintered bodies according to the present invention, which have an average grain size of the primary crystals $d_{50}$<1 μm, in particular $d_{50}$ <0.4 μm, exhibit particularly good properties. In addition, the moulded sintered bodies according to the present invention have hardnesses ($HV_{200}$) >19 Gpa and densities of >98% of the theoretical density TD. It is preferred that the moulded sintered bodies according to the present invention have an α-$Al_2O_3$ content >99%-wt. In addition to α-$Al_2O_3$, they can also contain one or more constituents of the oxides of elements such as Co, Cr, Fe, Hf, Mg, Mn, Nb, Ni, rare earths, Si, Ti, V, Zn, and Zr, these amounting to less than 50%-wt, preferably less than 20%-wt, and in particular less than 10%-wt, relative to the total quantity of solids.

A further object of the present invention is a process for manufacturing the moulded microcrystalline spherical sintered bodies, a suspension containing α-$Al_2O_3$ being subjected to fluid-bed spray granulation, the green bodies so obtained then being sintered at temperatures between 1200 and 1600° C. EP 0083 974 describes a process for manufacturing sintered bodies, in which a suspension that contains bauxite or an earth that contains aluminum silicon dioxide, is subjected to spray granulation. The resulting grains are then dried and sintered at temperatures between 1,200° C. and 1,659° C.

In the process according to the present invention, finely divided solids are used as the initial substances, and these are ground down and/or broken up to an average particle size of <3 μm, preferably <1 μm, and especially <0.4 μm, and used to produce the suspension. Reduction can advantageously be effected using a vibration mill, an attrition-type mill, or an agitator-ball mill, or by additional wet grinding to the desired grain size. It is preferred that the suspension contain 5 to 70%, preferably 15 to 50% solids, the suspension also containing 0.5 to 5% organic stabilisers, relative to the solids content, as auxiliary dispersants. It is preferred that the solvent be water. The use of other solvents such as alcohols, ketones, or other polar organic fluids is also possible. Very often, however, ecological and economic factors militate against this.

The suspension can be stabilized sterically or electrostatically. In the case of steric stabilisation, all known auxiliary dispersants can be used. Polyacrylic acids, polyglycol acids, polymethacrylic acids, organic bases such as triethylamine or carboxylic acids such as acetic acid or propionic acid are suitable for this purpose. It is preferred that the suspension contain between 0.5 and 5%-wt of appropriate organic stabilisers. In the case of electrostatic stabilisation, volatile inorganic acids such as nitric acid or hyrochloric acid, as well as ammonia as a base, can be used to advantage.

The suspension is stabilised either prior to grinding, or after grinding, with the help of a disperser; this ensures rapid and even distribution of the stabiliser. Sintering additives and binders can be added to the suspension, this being done preferably prior to, but also during and after stabilisation. All known sintering aids for $Al_2O_3$ or its precursors can be used as sintering additives.

It is preferred that the suspension according to the present invention contain 0.5 to 10%-wt of one or a plurality of binders from the group that includes methylcellulose, dextrin, sugars, starches, alginates, glycols, polyvinylpyrrolidon, lignin sulphonate, gum arabic, polyvinylalcohol and polyvinylacetate, relative to the solids content of the suspension. To equal advantage, the suspension can contain 0.5 to 10%-wt of one or more binders from the group that contains water glass, silicic sol, and boelmite sol.

Granulation is preferably carried out in air, and can be initiated in a fluid-bed apparatus that already contains the starting granulate. However, it is also possible to begin granulation in an empty apparatus, fluid-bed granulation being started as spray drying and nuclei being generated in situ.

The suspension that is to be granulated is introduced into the fluid bed by way of spray nozzles. The use of binary nozzles is particularly advantageous. Any gas that is inert under the prevailing working conditions can be used as the atomising gas. It is preferred that air be used for $Al_2O_3$. The quantity of atomising gas that is used can be varied within a very wide range, and is generally determined by the size of the apparatus and the type and quantity of product that is to be sprayed in. The temperature of the flow of atomising gas or the air entry temperature can similarly be within a wide range. Generally speaking, work is carried on at temperatures between 20 and 350° C. The separating-gas temperatures can vary within a wide range, and here, too, it is preferred that work be done in a range between 20 and 350° C. The quantity and velocity of the separating gas is determined by the density and the desired grain size of the granulate.

The grain size can be controlled primarily by the gas flow and velocity of the separator gas. In the case of $Al_2O_3$, using the zig-zag separator as described in DE-A 3 507 376, it is possible to select a narrow grain band in the grain size range between 0. 01 and 10 mm with a band width ≦21 mm.

The prepared granulate can be sintered directly—or preferably after a calcining intermediate step at temperatures between 300 and 600° C.—at temperatures between 1200 and 1600° C. Rotating cylindrical kilns, sliding-bat kilns, or chamber kilns can be used as the sintering kilns. It is particularly advantageous if the sintering be carried out in a rotating cylindrical kiln that is heated directly or indirectly, by which it is possible to obtain high heating rates combined with short dwell times, since this facilitates the production of dense sintered bodies without excessively vigorous crystal growth.

The process according to the present invention makes it possible to manufacture extremely dense moulded microcrystalline sintered bodies of great purity that are extremely hard and resistant to wear, the average primary crystal size of which is preferably smaller than 1 μm and whose diameter can be selected to be anywhere between 0. 01 and 10 mm.

Because of these properties, the sintered bodies according to the present invention are particularly well suited for use as grinding balls, insulation materials, fillers, for use as wear-resistant additives for laminates and lacquers, for use in ball bearings, as catalyst carriers, or the like.

One object of the present invention is thus the use of the sintered bodies according to the present invention as grinding balls, insulation materials, fillers, additives for laminates and lacquers, for use in ball bearings, as catalyst carriers, or the like.

The present invention will be described in greater detail below on the basis of the following examples, which should not be considered restrictive as to the present invention.

EXAMPLE 1

70 kg α-Al$_2$O$_3$ with an average grain size of d$_{50}$=1.5 μm, in the form of a 50-% aqueous slip stabilised with a polyacrylic acid as an auxiliary dispersant, was ground in an agitator-type ball mill to an average grain size of d$_{50}$=0.4 μm. The d$_{90}$ value of the suspension was 0.9 μm. The suspension was diluted with water to a solids content of 30%-wt, and 10 l of a 10-% aqueous solution of a polyvinylalcohol was added as a binder (Mowiol 8/88, Hoechst AG, Germany).

Next, the suspension was processed in a fluid-bed spray granulator (AGT 150, Glatt, Germany) at an air entry temperature of 95° C., a layer temperature of 45° C., a spray pressure of 3 bar, and a spray rate of 70 g/min. A fine granulate fraction with an average grain size of 0.2 mm, which had been obtained previously by fluid-bed spray granulation by way of in situ nucleus formation, was used for nucleus formation. Separation of the desired granulate was effected by a zig-zag separator that was operated a 9 Nm$^3$/h air. 70%-wt of the granulate so obtained had a diameter between 0.8 and 1.2 mm, in approximately 20%-wt the diameter was between 0.3 and 0.8 mm, and in approximately 10%-wt the granulate had a diameter of ≧1.2 mm. The residual moisture content of the granulate was less than 1%.

The granulate was calcined at 500° C. and then sintered at 1480° C. in a chamber kiln.

The moulded sintered bodies had a density of 98.3% of the TD and a hardness of 18.7 Gpa (HV=0.2). The average primary crystal size was 0.8 μm.

EXAMPLE 2

As in Example 1, although 2%-wt polyvinylpyrrolidon, relative to the Al$_2$O$_3$ content, was used as binder.

The moulded sintered bodies had a density of 96.5% of the TD, and a hardness of 17.6 Gpa (HV 0.2). The average primary crystal size was 0.8 μm.

EXAMPLE 3

As in Example 1, the separation of the desired granulate was effected by a separator chamber tha incorporates a series of zig-zag separators. The quantity of air was so adjusted that 98%-wt of the granulate that was removed had a diameter between 0.5 and 0.7 mm. The sintering was carried out directly, without calcining as an intermediate step, in a rotating cylindrical kiln at 1480° C.

The moulded sintered bodies had a density of 98.6% of the TD, and a hardness of 19.5 Gpa (HV 0.2). The average primary crystal size was 0.6 μm.

EXAMPLE 4 (use as a grinding body)

Commercially available α-Al$_2$O$_3$ with an average grain size d$_{50}$ of 1.5 μm was wet ground in an agitator-type ball mill (Type PMC 25 TEX, Drais) for 8 hours. The slurry had a solids content of 50%-wt. The grinding was carried out cyclically, each batch size amounting to 70 kg Al$_2$O$_3$. The grinding body charge in all tested cases was 65%-vol. The grinding body wear was determined after each grind, by weighing.

When reading the result obtained with YTZ (yttrium-stabilized zirconium oxide) grinding bodies, it should be remembered that the grinding balls are much more costly than the moulded spherical sintered bodies according to the present invention so that—given equally good results—grinding costs will be at least ten times greater compared to the costs associated width the use of grinding balls according to the present invention.

| | Grinding Body as in Example 1 | Commercially available Al$_2$O$_3$ grinding body | Commercially available YTZ Al$_2$O$_3$ grinding body | Commercially available grinding body |
|---|---|---|---|---|
| Chemical composition [% wt] | 95% Al$_2$O$_3$ | 99.5% Al$_2$O$_3$ | 95% ZrO2 5% Y2O3 | 86% Al$_2$O$_3$ 11% SiO2 3% other |
| Ball diameter | 1 mm | 1 mm | 1 mm | 1 mm |
| Wear on grinding body | 3% wt | 20% wt | 5% wt | 7% wt |
| Product fineness$_{d90}$ | 0.95 μm | 1.18 μm | 0.95 μm | 1.22 μ |
| Product fineness$_{d50}$ | 0.46 μm | 0.60 μm | 0.42 μm | 0.63 μm |

What is claimed is:

1. A molded microcrystalline sintered body comprising, as a primary ingredient -Al$_2$O$_3$, characterized in that
   (a) the body is a sphere made up of sintered particles of uniform shape obtained by fluid-bed spray granulation and having a primary particle size <3 μm,
   (b) the sintered body has an average grain size d50 of its primary crystals, less than 3 μm,
   the diameter of the molded sintered body between 0.01 and 10 mm, and,
   the body having a hardness of ≧95% of the theoretical density TD.

2. A molded spherical sintered body as defined in claim 1 characterized in that the average grain size of the primary crystal d$_{50}$ is ≦0.4 μm.

3. A molded spherical sintered body as defined in claim 1, characterized in that the hardness (HV$_{200}$) ≦19 Gpa and the density is ≦98% of the theoretical density TD.

4. A molded spherical sintered body as defined in claims 1 characterized in that the α-Al$_2$O$_3$ content ≦99wt-%.

5. A molded spherical body as defined in claim 1, characterized in that in addition to α-Al$_2$O$_3$, that contains one or more constituents from the group of oxides of elements such as Co, Cr. Fe, Hf, Mn, Nb, Ni, rare earths, Si, Ti, V, Zn and Zr, these amounting to less than 50%-wt, preferably less than 20%-wt, and in particular less than 10%-wt, relative to the total quantity of solids.

6. A process for manufacturing molded micro-crystalline spherical sintered bodies comprising, as a primary ingredient αAl$_2$O$_3$ with grain size d$_{50}$ of pimary crystals of under 3 microns, sintered body diameter of .01 to 10 mm and hardness of equal to greater than 16 Gpa (HV$_{200}$)and density equal to or greater than 95% of theoretical, comprising the steps of:
   (a) forming a suspension of αAl$_2$O$_3$ using Al$_2$O$_3$ solid of 3 micron or less,
   (b) processing the suspension through fluid bed spay granulation to form green bodies,
   (c) sintering the green bodies at 1,200–1600° C.

7. The process of claim 6 wherein the maximum particle size of solids in the suspension is limited to 1 micron or less.

8. The process of claim 7 wherein the maximum particle size of solids in the suspension is limited to 0.4 micron or less.

9. The process of either of claims 6 wherein the suspension contains 0.5–5wt % organic stabilizers, relative to the solids content, as organic dispersant.

10. A microcrystalline spherical sintered body made by the process of claim 6.

11. The product of either of claims 1 or 10 formed as grinding balls.

12. The product of claim 9 formed as insulating material or portions thereof.

13. The product of claims 1 or 10 formed as fillers.

14. The product of claims 1 or 10 formed as catalyst carriers or portions thereof.

15. The product of claims 1 or 10 formed as additives to laminates to impart wear resistance thereto.

16. The product of claims 1 or 10 as incorporated in a lacquer.

17. The product of claims 1 or 10 formed as ball bearings or portions thereof.

* * * * *